United States Patent
Hohl

(10) Patent No.: US 8,963,722 B2
(45) Date of Patent: Feb. 24, 2015

(54) APPARATUS AND METHOD FOR PLAYING AND/OR GENERATING AUDIO CONTENT FOR AN AUDIENCE

(75) Inventor: Fritz Hohl, Stuttgart (DE)

(73) Assignee: Sony Corporation, Tokyo (JP)

( * ) Notice: Subject to any disclaimer, the term of this patent is extended or adjusted under 35 U.S.C. 154(b) by 644 days.

(21) Appl. No.: 13/253,553

(22) Filed: Oct. 5, 2011

(65) Prior Publication Data

US 2012/0092167 A1  Apr. 19, 2012

(30) Foreign Application Priority Data

Oct. 14, 2010  (EP) .................................... 10187541

(51) Int. Cl.
| | | |
|---|---|---|
| G08B 23/00 | (2006.01) | |
| G06F 3/01 | (2006.01) | |
| G06F 3/03 | (2006.01) | |
| G10H 1/00 | (2006.01) | |
| G06K 9/00 | (2006.01) | |
| H04R 27/00 | (2006.01) | |

(52) U.S. Cl.
CPC .............. *G06F 3/017* (2013.01); *G06F 3/0304* (2013.01); *G10H 1/0008* (2013.01); *G06K 9/00778* (2013.01); *H04R 27/00* (2013.01); *H04R 2430/01* (2013.01); *G10H 2220/351* (2013.01)
USPC ......... 340/573.1; 340/5.5; 340/500; 340/540; 340/539.1; 340/539.11; 340/539.12; 340/539.13; 340/539.14; 340/539.15; 340/539.17; 340/539.23; 340/539.24; 340/539.25; 340/539.26; 340/539.27; 340/573.4

(58) Field of Classification Search
None
See application file for complete search history.

(56) References Cited

U.S. PATENT DOCUMENTS

| | | |
|---|---|---|
| 5,121,201 A | 6/1992 | Seki |
| 6,856,990 B2 | 2/2005 | Barile et al. |
| 6,888,457 B2 | 5/2005 | Wilkinson et al. |
| 7,082,469 B2 | 7/2006 | Gold et al. |
| 7,592,534 B2 | 9/2009 | Yoshikawa et al. |

(Continued)

FOREIGN PATENT DOCUMENTS

| | | |
|---|---|---|
| GB | 2 351 596 A | 1/2011 |
| KR | 10-2008-0101284 | 11/2008 |

(Continued)

OTHER PUBLICATIONS

Antonio Albiol et al., "Real-Time High Density People Counter Using Morphological Tools", IEEE Transactions on Intelligent Transportation Systems, vol. 2, No. 4, Dec. 2001, pp. 204-218.

(Continued)

*Primary Examiner* — Curtis King
(74) *Attorney, Agent, or Firm* — Oblon, Spivak, McClelland, Maier & Neustadt, L.L.P.

(57) ABSTRACT

An apparatus for at least one of playing and generating audio content for an audience includes circuitry. The circuitry is configured to receive sensor data from one or more sensors monitoring the audience. The circuitry is configured to analyze said sensor data to identify characteristic movement patterns of one or more members of the audience. The circuitry is configured to select music and generate verbal communication other than music to address the audience, based on the identified characteristic movement patterns. The circuitry is further configured to output said selected music and said verbal communication. A corresponding method for at least one of playing and generating audio content for an audience is also provided.

26 Claims, 2 Drawing Sheets

(56) References Cited

U.S. PATENT DOCUMENTS

| | | | |
|---|---|---|---|
| 7,856,360 B2* | 12/2010 | Kramer et al. | 705/1.1 |
| 2003/0033600 A1* | 2/2003 | Cliff et al. | 725/12 |
| 2006/0095516 A1* | 5/2006 | Wijeratne | 709/205 |
| 2007/0136533 A1* | 6/2007 | Church et al. | 711/137 |
| 2008/0136839 A1* | 6/2008 | Franko et al. | 345/634 |
| 2008/0195593 A1* | 8/2008 | Harju et al. | 707/5 |
| 2008/0282870 A1* | 11/2008 | Carrick et al. | 84/601 |
| 2009/0019374 A1* | 1/2009 | Logan et al. | 715/753 |
| 2010/0215195 A1* | 8/2010 | Harma et al. | 381/119 |
| 2013/0132837 A1* | 5/2013 | Mead et al. | 715/716 |

FOREIGN PATENT DOCUMENTS

| | | |
|---|---|---|
| WO | WO 02/09088 A2 | 1/2002 |
| WO | WO 02/09088 A3 | 1/2002 |

OTHER PUBLICATIONS

Matthew Toews et al., "Detection, Localization and Sex Classification of Faces from Arbitrary Viewpoints and Under Occlusion", IEEE Transactions on Pattern Analysis and Machine Intelligence, Journal of Latex Class Files, vol. 6, No. 1, Jan. 2007, pp. 1-16.

Ju Sun et al., "Hierarchical Spatio-Temporal Context Modeling for Action Recognition", IEEE, 2009, pp. 2004-2011.

Adam Field et al., "Personal DJ, an Architecture for Personalised Content Delivery", http://porta.acm.org/citation.cfm?id=371921, May 1-5, 2001, pp. 1-8.

* cited by examiner

APPARATUS AND METHOD FOR PLAYING AND/OR GENERATING AUDIO CONTENT FOR AN AUDIENCE

CROSS-REFERENCE TO RELATED APPLICATIONS

The present application claims priority of European patent application 10187541.7 filed on Oct. 14, 2010.

FIELD OF THE INVENTION

The present invention relates to an apparatus and a corresponding method for playing and/or generating audio content for an audience. Further, the present invention relates to a computer program and a computer readable non-transitory medium. The invention relates particularly to an apparatus that can be used as an automatic party DJ system.

BACKGROUND OF THE INVENTION

Music entertainment at parties usually involves a Disc Jockey (DJ), a person who selects the music to be played and who possibly also talks to the audience between songs. For example, the DJ might share comments about his selection of songs, encourage the audience to dance more actively or comment on the dance energy and style of the audience. The DJ can be of huge importance for the attractiveness of an event: Discos usually advertise their events with the famous names of the (guest) DJs.

Not for every party a famous DJ is available, and in some cases it is desirable to replace the human DJ by an electronic equivalent. Such a method was presented for example in U.S. Pat. No. 6,888,457, which discloses a portable apparatus for monitoring the reaction of a user to a performance, containing one or more sensors for detecting an indirect user response to the performance and a user interface enabling the user to provide a direct user response to the performance. A processor in the portable apparatus is programmed to provide a user reaction signal comprising a combination of the indirect user response and the direct user response to the performance. This user reaction signal may be transmitted to a remote apparatus. A monitoring system using such portable apparatus and a music playing system using such a monitoring system are also described.

BRIEF SUMMARY OF INVENTION

It is an object of the present invention to provide an apparatus and a corresponding method for playing music and generating verbal communication for an audience. It is a further object of the invention to provide music and verbal entertainment in a way that is similar to the way how a human DJ interacts with his or her audience.

According to an aspect of the present invention there is provided an apparatus for playing and/or generating audio content for an audience, comprising a sensor input that receives sensor data from one or more sensors monitoring the audience, a situation recognition unit that analyzes said sensor data to identify characteristic movement patterns of one or more members of the audience, a control unit that selects music and/or generates verbal communication based on the identified characteristic movement patterns, and an audio output that outputs said selected music and/or said verbal communication.

According to another aspect of the invention, there is provided a method for playing and or generating audio content for an audience, comprising the steps of receiving sensor data from one or more sensors monitoring the audience, analyzing said sensor data to identify characteristic movement patterns of one or more members of the audience, selecting music and/or generating verbal communication based on the identified characteristic movement patterns, and outputting said selected music and/or said verbal communication.

According to still further aspects a computer readable non-transitory medium having instructions stored thereon which, when carried out on a computer, cause the computer to perform the steps of the method according to the present invention is provided.

Preferred embodiments of the invention are defined in the dependent claims. It shall be understood that the claimed apparatus, the claimed method, the claimed computer program and the claimed computer readable medium have similar and/or identical preferred embodiments as the claimed apparatus and as defined in the dependent claims.

The present invention therefore provides a solution for an apparatus and a method that mimic the function of a human DJ. This is achieved without requiring the members of the audience to interact with the apparatus in any special way. Simply because of their dancing or other activities the members of the audience provide input for the one or more sensors, which allows the situation recognition unit to analyze the sensor data and act in a way similar to a human DJ.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

Figure 1:
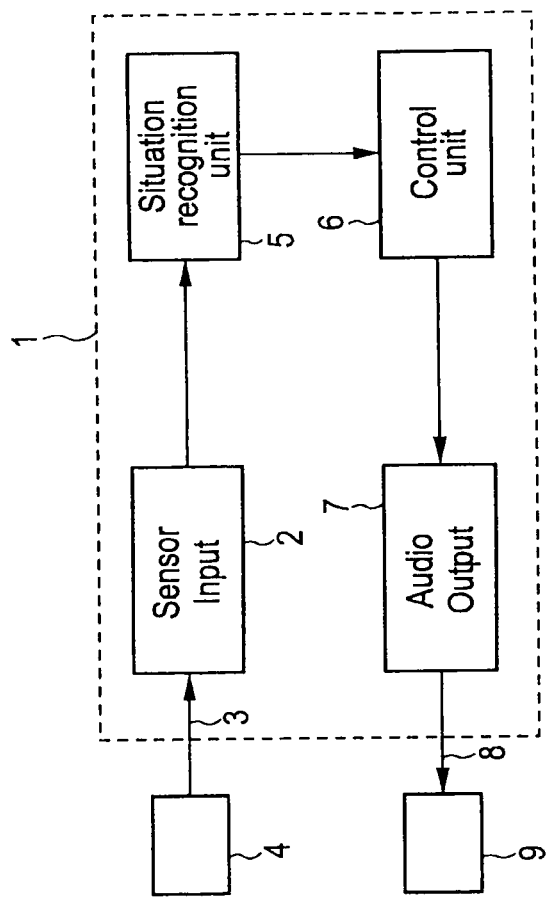
FIG. 1 shows a schematic diagram of the general layout of an apparatus according to the present invention.

FIG. 1 shows a schematic diagram of the general layout of an apparatus 10 according to the present invention. Generally, said apparatus 1 for playing and/or generating audio content for an audience comprises a sensor input 2 that receives sensor data 3 from one or more external sensors 4 monitoring the audience, a situation recognition unit 5 that analyzes said sensor data 3 to identify characteristic movement patterns of one or more members of the audience, a control unit 6 that selects music and/or generates verbal communication based on the identified characteristic movement patterns, and an audio output 7 that outputs audio data 8, i.e. said selected music and/or said verbal communication, through external audio playing means 9, e.g. loudspeaker and/or a sound system.

Figure 2:
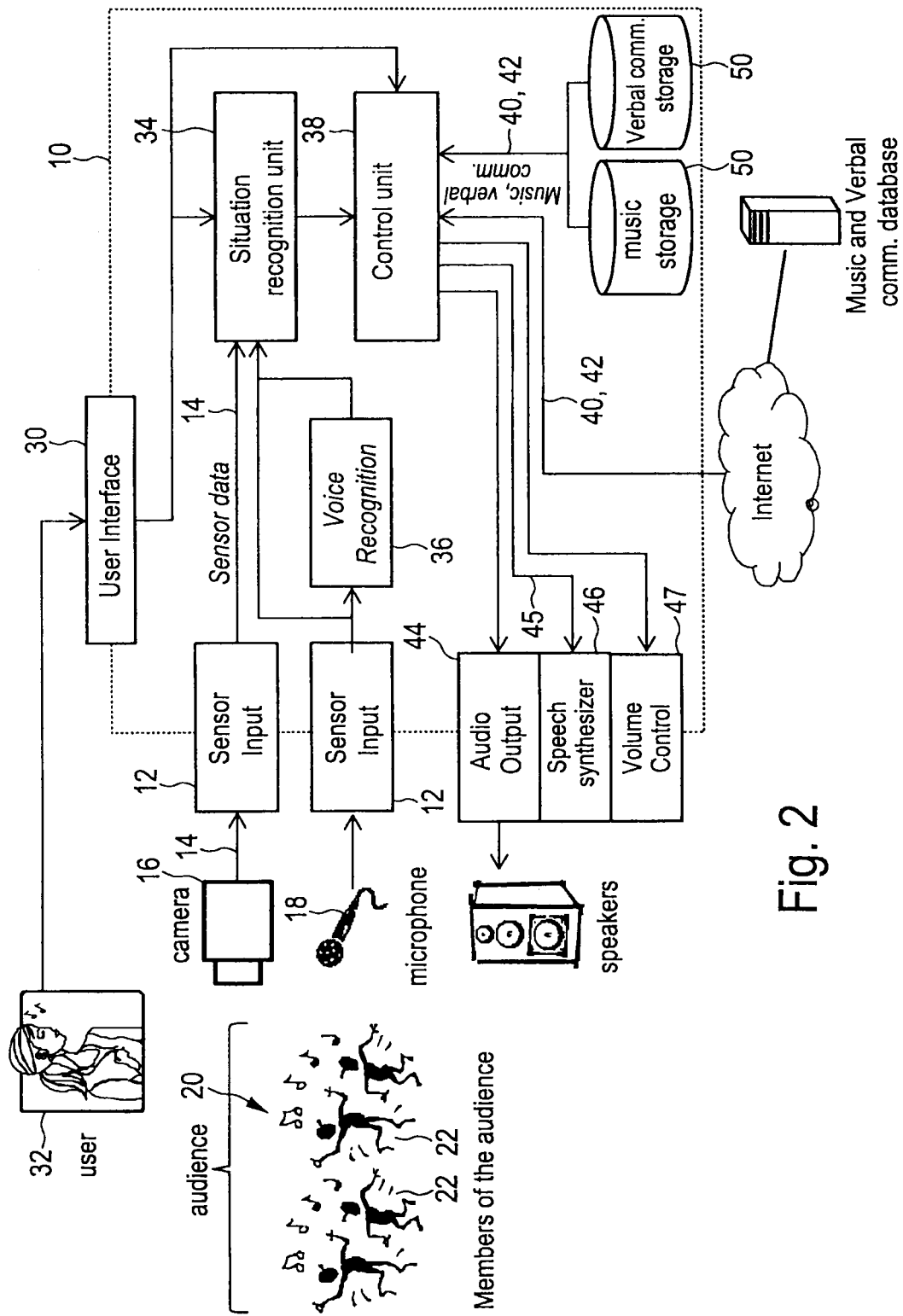
FIG. 2 shows a schematic diagram of an embodiment of an apparatus according to the present invention.

FIG. 2 shows a schematic diagram of an exemplary embodiment of an apparatus 10 according to the present invention and its relation to other elements outside the apparatus 10. The apparatus 10 comprises a sensor input 12 which receives sensor data 14 from a camera 16 and a microphone 18 which are monitoring the audience 20. Even though the camera 16 and the microphone 18 are targeted at monitoring the members 22 of the audience 20, some of the members 22 of the audience 20 may be outside the reach of the camera 16 and the microphone 18. The apparatus 10 further comprises a user interface 30 which can be operated by a user 32. The user may be a member 22 of the audience 20. The situation recognition unit 34 analyzes the sensor data 14 to identify characteristic movement patterns of one or more members 22 of the audience 20. Based on the identified characteristic movement patterns, the control unit 38 selects music 40 and/or generates verbal communication 42. The audio output 44 outputs the selected music 40 and/or the verbal communication 42.

In the following these elements will be explained in more detail.

This embodiment of the apparatus uses a video camera 16 as sensor input. This has the advantage that the apparatus can perceive the audience 20 in the same way as a human DJ does. Instead of a normal camera 16, it is also possible to use a millimeter wave camera, i.e. a camera that records radiation e.g. passively in the 30 GHz to 3 THz area, e.g. using a radiometer. This would have the advantage of being able to distinguish between human bodies and other elements on and around the dance floor (i.e. the area that is preferably, but not necessarily exclusively monitored by the sensors and sounded by the loudspeakers connected to the audio output 44) even in low-light conditions and even when all objects on and around the dance floor have body temperature (which would render e.g. a thermal camera useless). Further possible sensors that are not shown in FIG. 2 may include pressure sensors, simple light sensors, temperature sensors, smell sensors, and radar sensors.

The user interface 30 allows the user to enter information about characteristics or preferences of the one or more members 22 of the audience 20, for example song wishes. If such information is available, the control unit 38 is adapted to take said information into account when selecting music 40 and/or generating verbal communication 42. This has the advantage that the control unit can better adapt towards preferences of the audience 20. A song wish from a user is checked against the available music (alternatively, the user can select only in the list of available music). If the song is found, it is scheduled for being played soon. Along the part of the song wish that actually specifies the song, the user can also specify a dedication (e.g. "For Jack") that is then spoken (i.e. speech-synthesized) by a verbal communication preceding the specified song.

Based on the sensor data from the sensors, in particular from the cameras, the situation recognition unit 34 generally recognizes the dance energy of the audience 20, wherein the dance energy represents the level of physical activity of the crowd. The dance energy can be defined as a set of levels ranging from standing still on the dance floor to very energetic levels of dance found, e.g., in pogo dancing. These levels of music can depend on the type of music and its typically associated types of dancing. In order to increase the energy level of the dancers, the control unit 38 could e.g. add more motivating comments into the DJ text.

Preferably, the dance energy is calculated using algorithms used in the area of recognizing actions in realistic videos. For example in "Hierarchical Spatio-Temporal Context Modeling for Action Recognition" (Sun, Wu, Yan, Cheong, Chua, and Li, 2009) a hierarchically designed system to recognize actions from a video source is described, which description is herein incorporated by reference. The two lower hierarchical levels of this method (SIFT average descriptors and trajectory transition descriptors) allow automatically deriving trajectories of certain points in the video across different frames. In a videographed dancing environment of multiple people, these trajectories correspond to movements of different body parts of different dancers. Therefore, the sum of these trajectories can be used as a measure of the energy of the members of the audience on the dance floor. The measure can be further refined by grouping neighbored similar trajectories as one trajectory as it can be assumed that these different trajectories having the same direction and length belong to different points on the same dancer.

Further, based on the sensor data from the sensors, in particular the cameras, the situation recognition unit 34 can preferably also recognize the number of people on the dance floor and/or the sex of the people on the dance floor. This can be implemented by known methods. For example, there are several technologies on the market that can count the number of people in the output of a video camera, e.g. products from Reveal (http://www.reveal.co.nz/computer.html). Further, such methods are described in U.S. Pat. No. 5,121,201, or Albiol, A.; Mora, I.; Naranjo, V.; Real-time high density people counter using morphological tools. In: IEEE Transactions on Intelligent Transportation Systems, Volume: 2 Issue: 4, December 2001, pp. 204-218. Detecting the gender of people may use a face recognition method is described in Toews, M.; Arbel, T: Detection, Localization, and Sex Classification of Faces from Arbitrary Viewpoints and under Occlusion. In: IEEE Transactions on Pattern Analysis and Machine Intelligence, Volume: 31, Issue: 9, pp.1567-1581, September 2009. The description of such methods for use in the situation recognition unit 34 according to the present invention provided in such documents is herein incorporated by reference.

It is possible that only a certain part of the members 22 of the audience 20 are within the reach of the sensors 16, 18. Thus, if the apparatus 10 can be provided with the male/female ratio of the complete audience 20 through the user interface 30, the apparatus 10 can compare this with the measured male/female ratio of the members of the audience that are within reach of the sensors. Consequently, the apparatus 10 could, e.g., schedule more popular songs for the sex with the lower number of dancers, add more invitational comments to the missing sex into the DJ text, or schedule a "ladies choice" event (where the females shall invite a male to dance with them) in case there is a lack of male dancers on the dance floor. The control unit 38 may also take the average age of the members of audience into account.

The audio output 44 comprises a volume control 47 and the control unit is adapted to set the volume based on said characteristic movement or behavior patterns.

The situation recognition unit 34 may also recognize characteristic behavior patterns of one or more members 22 of the audience 20. Such characteristic behavior patterns can comprise behavior patterns that are characteristic for enthusiasm, exhaustion, boredom, anger and/or members of the audience talking with other members of the audience. Identifying such characteristic behavior patterns allows the apparatus 10 to better adapt the music and/or verbal communication to the audience. For example, if the situation recognition unit recognizes that many members of the audience are talking with each other, the control unit 38 could change the volume 47 such that the music does not drown out the conversation of the audience. If the situation recognition unit 34 recognizes that there is a heated argument between members of the audience, it could provide soothing music or generate jokes or comments that might help distract the arguing members of the audience. If the members of the audience appear bored, it could select more energetic music, or if the audience appears exhausted, more relaxing music could be selected.

In an embodiment, based on the sensor data 14 that is received from the one or more microphones 18, the situation recognition unit 34 can determine the audio signal that is generated by the audience. This can be achieved, for example, by subtracting the signal that is generated from the music 40 from the signal received from the microphone 18. Based on the audio signal that was estimated to be originating from the audience, the situation recognition unit 34 can recognize characteristics of speech of members of the audience 20. Based on these characteristics of the speech of members of the audience, the control unit 38 can choose music 40 and/or verbal communication 42. Such characteristics of the speech of the audience can, for example, include the volume of the speech of the audience, or whether the speech is more similar to a booing sound (expressing discontent with the selected music 40) or excitement about a song that just started playing. Rhythmic clapping of hands is another characteristic sound that can be recognized and that can serve as an indicator of a favorable response of the audience 20.

In an embodiment, a voice recognition unit 36 is provided which can recognize words and/or sentences spoken by one or more members 22 of the audience 20. This allows the control unit 38 to respond more accurately to clearly expressed wishes of the audience. For example, the audience could shout the names of specific songs or bands, and the control unit 38 could immediately select the corresponding song. Alternatively, the audience could be informed that the apparatus can respond to specific commands, such as "more", "louder", "faster", to name a few examples. It would even be conceivable that the apparatus directly asks the crowd questions "Do you want . . . ?" and the crowd would reply by shouting "Yes", "No", or even more specific answers. The voice recognition unit 36 can recognize such reactions of the audience, and may also provide the recognized word or sentence to the situation recognition unit 34 for further processing, e.g. to take this information into account for the situation recognition.

The volume of the reply of the audience could be used as an indicator for how many members of the audience are shouting this reply. For example, if the apparatus offers several choices to the audience, the choice which yields the loudest reply from the audience could be seen as the choice that is favored by the highest number of members of the audience.

In another embodiment the apparatus 10 further comprises a storage 50 for music and/or verbal communication. Furthermore, the apparatus 10 is capable of downloading music or verbal communication from the Internet. Accessing music that is not locally available over the Internet allows the apparatus to select from a larger selection of songs and to better fulfill music wishes of the audience 20. In addition to music also verbal communication can be accessed over the Internet. This allows updating the apparatus 10 remotely and allows the apparatus 10 to provide music and verbal comments that relate to current events.

The audio output 44 is preferably equipped with a speech synthesizer 46. The control unit 38 generates text 45 and the speech synthesizer 46 generates speech from said text. The possibility to generate speech based on text allows generating speech even for words for which no spoken recording is already available. In this way, the apparatus can, for example, introduce songs and artists even if aside from the name no further metadata is available in the local storage 50 or the Internet.

The control unit 38 preferably uses a set of rules to select music and/or generate verbal communications. In particular, it comprises several sets of rules to select music and/or generate verbal communication and the user interface 30 provides a means for choosing which one of said several sets of rules should be used. This refinement has the advantage that the apparatus can provide several "personalities", which can be more appropriate for different occasions. For example, there might be more formal parties or very relaxed youth events, where different kinds of music and/or verbal communication are appropriate. The different personalities could be chosen from for example using the provided user interface 30.

Depending on the selected set of rules the control unit 38 schedules the songs, chooses transitions between the songs as texts, connects songs and texts, and renders the text into the audio form using the speech synthesizer. Different personalities can also correspond to different voices generated by the speech synthesizer 46.

In an embodiment the apparatus 10, also referred to as party DJ system, may also know (e.g. determine) the music energy level (e.g. the beats per minute, the volume level, etc.) of the played songs, e.g. either from own calculations or from the metadata of these songs. Optionally, an action by the apparatus 10 may be triggered if there is a (significant) difference (e.g. above a predetermined threshold) between the music energy level of the played songs and the dance energy level of the audience, in particular the members of the audience on the dance floor. Said difference may, for instance, be determined by a comparison. The triggered action may, for instance, be a specific music selection and/or may have an influence on the music selection. The triggered action may also or alternatively result in the apparatus 10 interacting with the audience, in particular through verbal communication, e.g. motivations to perform certain actions or to do something particular.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An apparatus for at least one of playing and generating audio content for an audience, comprising:
   circuitry configured to
   receive sensor data from one or more sensors monitoring the audience,
   analyze said sensor data to identify characteristic movement patterns of one or more members of the audience,
   select music and generate verbal communication other than music to address the audience, based on the identified characteristic movement patterns, and
   output said selected music and said verbal communication.

2. The apparatus according to claim 1, wherein the one or more sensors comprise one or more video cameras.

3. The apparatus according to claim 1, wherein the one or more sensors comprise one or more millimeter-wave cameras.

4. The apparatus according to claim 1, wherein said circuitry is configured to
analyze the sensor data to recognize the sex of said one or more members of the audience, and
take the recognized sex into account when at least one of selecting music and generating verbal communication.

5. The apparatus according to claim 1, further comprising a user interface for entering information about characteristics or preferences of the one or more members of the audience, wherein
said circuitry is configured to take said information into account when at least one of selecting music and generating verbal communication.

6. The apparatus according to claim 5, wherein said characteristics or preferences of the one or more members of the audience include at least one of the average age of the participants, the male/female ratio, the number of members of the audience, music preferences, and specific song wishes.

7. The apparatus according to claim 5, wherein said user interface is adapted for entering music wishes, and
the circuitry is configured to take the music wishes into account when at least one of selecting music and generating verbal communication.

8. The apparatus according to claim 1, wherein said circuitry is configured to recognize characteristic behavior patterns of one or more members of the audience, said characteristic behavior patterns comprising behavior patterns that are characteristic for at least one of enthusiasm, exhaustion, boredom, anger, and members of the audience talking with other members of the audience.

9. The apparatus according to claim 1, wherein the circuitry is configured to
output at least one of the selected music and the verbal communication with an adjustable volume, and
set the adjustable volume based on said characteristic movement or behavior patterns.

10. The apparatus according to claim 1, wherein the one or more sensors comprise one or more microphones.

11. The apparatus according to claim 10, wherein said circuitry is configured to detect from the microphone data an audio signal that is generated by the audience.

12. The apparatus according to claim 11, wherein said circuitry is configured adapted to detect the audio signal that is generated by the audience by subtracting from an audio signal that is recorded by the one or more microphones a signal that is caused by the music.

13. The apparatus according to claim 10, wherein the circuitry is configured to
recognize characteristics of speech of members of the audience, and
take said characteristics of the speech of members of the audience into account when at least one of selecting music and generating verbal communication.

14. The apparatus according to claim 10, wherein the circuitry is configured to
recognize at least one of words and sentences spoken by one or more members of the audience based on said audio signals, and
take said recognized at least one of words and sentences into account when at least one of selecting music and generating verbal communication.

15. The apparatus according to claim 1, wherein said characteristic movement patterns comprise different categories of dance style.

16. The apparatus according to claim 1, wherein said circuitry is further configured to recognize a dance energy of the one or more members of the audience, said dance energy representing the level of physical activity of the one or more members of the audience.

17. The apparatus according to claim 1, further comprising a storage for at least one of music and verbal communication and a device to access at least one of music and verbal communication over the Internet.

18. The apparatus according to claim 1, wherein said circuitry is configured to
generate text, and
generate verbal communication from said text.

19. The apparatus according to claim 1, wherein the selected music comprises individual pieces of selected music, and wherein the circuitry is configured to generate verbal communication between said individual pieces of selected music.

20. The apparatus according to claim 18, wherein said generated verbal communication comprises at least one of jokes, invitations, remarks, and other statements targeted at the one or more members of the audience.

21. The apparatus according to claim 1, wherein the circuitry is configured to use a set of rules to at least one of select music and generate verbal communications.

22. The apparatus according to claim 6, wherein the circuitry is configured to identify at least one of a male/female ratio and a total number of members of the audience who are dancing and said set of rules to at least one of select music and generate verbal communication takes at least one of said male/female ratio and said total number of members of the audience who are dancing into account.

23. The apparatus according to claim 22, wherein the circuitry is configured to use several sets of rules to at least one of select music and generate verbal communication and the user interface provides a device to choose which one of said several sets of rules should be used.

24. The apparatus according to claim 16, wherein said circuitry is configured to determine a music energy level of actually played music, to compare said music energy level to said dance energy level and to at least one of select music and generate verbal communication in case of a significant difference between said music energy level and said dance energy level.

25. A method for at least one of playing and generating audio content for an audience, comprising:
receiving sensor data from one or more sensors monitoring the audience,
analyzing said sensor data to identify characteristic movement patterns of one or more members of the audience,
selecting music and generating verbal communication other than music to address the audience, based on the identified characteristic movement patterns, and
outputting said selected music and said verbal communication.

26. A computer readable non-transitory medium having instructions stored thereon which, when carried out on a computer, cause the computer to perform of the method as claimed in claim 25.

* * * * *